United States Patent [19]

Bell

[11] Patent Number: 4,667,136
[45] Date of Patent: May 19, 1987

[54] CROSS-COUPLING DRIVE CIRCUIT

[75] Inventor: John Bell, Belmont, Calif.

[73] Assignee: Gordon W. Rosenberg, San Ardo, Calif.

[21] Appl. No.: 848,593

[22] Filed: Apr. 4, 1986

[51] Int. Cl.$^4$ .............................................. H02P 7/68
[52] U.S. Cl. ........................................ 318/51; 318/53; 318/68; 318/139; 180/907
[58] Field of Search ................. 318/51, 53, 55, 59, 318/66, 67, 68, 77, 78, 79, 139; 333/24 R; 330/191, 198, 181; 180/65.1, 65.3, 65.8, 907

[56] References Cited

U.S. PATENT DOCUMENTS

| | | | |
|---|---|---|---|
| 3,100,860 | 8/1963 | Rosenthal | 318/55 |
| 4,157,123 | 6/1979 | Rodaway | 180/907 X |
| 4,260,936 | 4/1981 | Sun | 318/66 |
| 4,511,825 | 4/1985 | Klimo | 318/67 |

Primary Examiner—William M. Shoop, Jr.
Assistant Examiner—Bentsu Ro
Attorney, Agent, or Firm—Townsend & Townsend

[57] ABSTRACT

An improved drive circuit for steering a motorized wheelchair. A control mechanism produces right and left drive signals to respective right and left wheel drive motors. These right and left drive signals are amplified by right and left amplifiers to provide the necessary magnitude power signal to the motors. The input to the amplifiers are cross-coupled so that each amplifier will amplify its own input signal plus a portion of the cross-coupled input signal.

6 Claims, 1 Drawing Figure

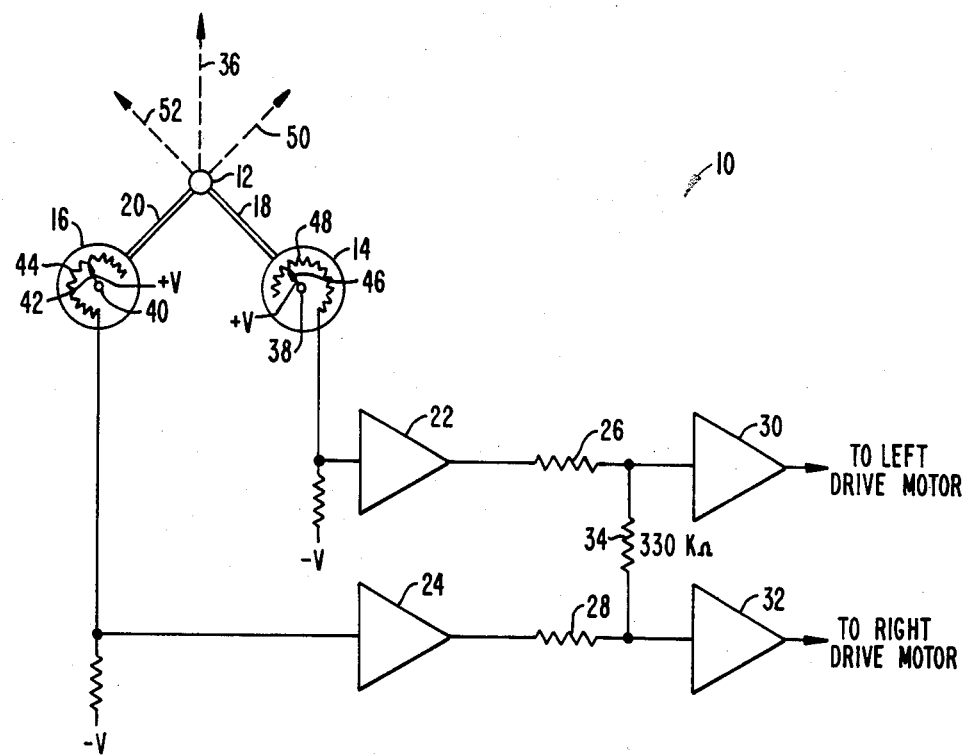
FIG._1.

CROSS-COUPLING DRIVE CIRCUIT

BACKGROUND

The present invention relates to control circuits for steering a motorized wheelchair.

A typical motorized wheelchair will have a right drive motor for the right wheel and a left drive motor for the left wheel. The wheelchair can be steered by applying more power to the right motor or the left motor, respectively. This is typically done with a joystick control which is coupled to a pair of potentiometers. Each potentiometer provides an input to an amplification and drive circuit to drive the respective motors. When the joystick is moved to the right, for instance, the signal from the right potentiometer will increase while the signal on the left potentiometer will decrease. For sharp turns, in fact, one motor may be put into reverse. Thus, for instance, for a sharp right turn, the left motor will have a large forward power applied while the right motor will be put slightly into reverse.

This mechanism for turning a wheelchair causes difficulty when one is trying to steer a wheelchair in a straight line. This difficulty arises because a slight movement to the side with the joystick will tend to put the wheelchair into a turn, thereby making it move erratically. This is particularly difficult for the handicapped who do not have sufficient motor control to accurately move the joystick. There is thus a need for a control circuit which can provide turning signals to the drive motors while allowing the wheelchair to be driven in a straight line without requiring precise joystick control.

SUMMARY OF THE INVENTION

The present invention is an improved drive circuit for steering a motorized wheelchair. A control mechanism produces right and left drive signals to respective right and left wheel drive motors. These right and left drive signals are amplified by right and left amplifiers to provide the necessary magnitude power signal to the motors. The input to the amplifiers are cross-coupled so that each amplifier will amplify its own input signal plus a portion of the cross-coupled input signal.

This cross-coupling thus provides for a control circuit which is less sensitive to small movements in a control mechanism. Preferably, the input mechanism is a joystick coupled to right and left potentiometers. When a large turn signal is produced by one potentiometer, this is partially cancelled by the negative signal on the other potentiometer. Thus, the wheelchair will not tend to turn for small side-to-side movements of the joystick. Because only a portion of the other signal is cross-coupled in, for large side-to-side movements of the joystick turning will result. Thus, the present invention enables a motorized wheelchair to turn with large movements but also reduces the tendency to turn for small side-to-side movements of the joystick when the driver is attempting to steer the wheelchair in a straight line.

In a preferred embodiment, the input signal from each potentiometer is supplied to a buffer amplifier, a series resistor and a drive amplifier. The junction between the series resistor and a drive amplifier for each circuit is coupled together using a resistor. This resistor preferably has a value of approximately 330K ohms.

For a fuller understanding of the nature and advantages of the invention, reference should be made to the ensuing detailed description taken in conjunction with the accompanying drawing.

BRIEF DESCRIPTION OF THE DRAWINGS

FIG. 1 is a schematic diagram of a preferred embodiment of the drive circuit according to the present invention.

DETAILED DESCRIPTION OF THE PREFERRED EMBODIMENTS

FIG. 1 shows a joystick control circuit 10 according to the present invention. A joystick 12 is coupled to a pair of potentiometers 14, 16 through a pair of coupling bars 18, 20. Potentiometers 14 and 16 are coupled to the inputs of buffer amplifiers 22 and 24, respectively. The outputs of buffer amplifiers 22 and 24 are coupled through series resistances 26 and 28, respectively. The other side of series resistors 26 and 28 are coupled to the input of drive amplifiers 30 and 32, respectively. The output of drive amplifiers 30 and 32 are supplied to power drive circuitry for the left drive motor and the right drive motor, respectively.

A coupling resistor 34 couples together the inputs of drive amplifiers 30 and 32. This coupling resistor has sufficient value to insure that the cross-coupled input signal is less than the primary input signal. For instance, the primary input signal for amplifier 30 comes from the output of buffer amplifier 22 while the cross-coupled signal is provided through buffer amplifier 24, series resistor 28 and cross-coupling resistor 34. Similarly, the primary input signal for drive amplifier 32 is provided through buffer amplifier 24 and series resistor 28. The cross-coupling input signal for drive amplifier 32 is provided through buffer amplifier 22, series resistor 26 and cross-coupling resistor 34. Resistor 34 preferably has a value of approximately 330K ohms.

In operation, joystick 12 is moved straight ahead in the direction of arrow 36 when it is desired to move the wheelchair in a straight line. Thus, equal input signals will be applied through a potentiometers 14 and 16 to buffer amplifiers 22 and 24, respectively. These equal drive signals will be propagated through the respective series resistors 26 and 28 and drive amplifiers 30 and 32. Because the input signal to drive amplifier 30 and drive amplifier 32 will be equal, no signal will be cross-coupled through cross-coupling resistor 34 and both motors will have the same amount of power applied.

The mechanism for attaching joystick 12 to potentiometers 14 and 16 can be varied so that either the shaft or the casing is moved relative to the other. Preferably, bar 18 is coupled to a central shaft 38 on potentiometer 14 and bar 20 is coupled to a central shaft 40 on potentiometer 16. Shaft 40 is coupled to a contact 42 which moves along the resistance 44 of potentiometer 16. Similarly, shaft 38 is connected to contact 46 which moves along resistor 48 of potentiometer 14.

When it is desired to make a right turn, joystick 12 is moved in the direction of arrow 50. This movement will cause shaft 38 and contact 46 to move so that a higher voltage is applied to the input of buffer amplifier 22 by virtue of the lower portion of resistor 48 being coupled between the positive voltage and the input to buffer amplifier 22. At the same time, by virtue of the movement of contact 42, a higher portion of resistor 44 is interposed between the positive voltage and the input to buffer amplifier 24. This results in a signal being presented to the input of drive amplifier 30 which is higher than the input being presented to the input of drive amplifier 32. Thus, the left drive motor, which is coupled to the output of drive amplifier 30, will have more power applied, while the right drive motor, which is coupled to the output of drive amplifier 32, will have less power applied. However, the effect of cross-coupling resistor 34 will have a summation effect between the primary input signal and the cross-coupled input signal so that the difference between the signals applied to the inputs to drive amplifiers 30 and 32 will be less than the difference without coupling resistor 34. Thus, for small movements of joystick 12 to the right or to the left, resistor 34 will prevent any significant difference in the power applied to the right and left drive motors.

Similarly, the movement of joystick 12 to the left in the direction of arrow 52 will have the opposite effect.

As will be understood by those familiar with the art, the present invention may be embodied in other specific forms without departing from the spirit or essential characteristics thereof. For example, another element having resistive features could be substituted for resistor 34 or resistor 34 could be placed in another location so long as it couples together the signals on the two drive circuits. Accordingly, the disclosure of the preferred embodiment of the invention is intended to be illustrative, but not limiting, of the scope of the invention which is set forth in the following claims.

What is claimed is:

1. An apparatus for controlling the steering of a wheelchair having a right wheel drive motor and a left wheel drive motor, comprising:
   means for producing right and left control signals, said right control signal being larger for steering right, said left control signal being larger for steering left and said right and left signals being equal for steering straight;
   right and left amplifier for amplifying said right and left control signals, respectively;
   means for coupling an input of each of said right and left amplifiers together so that said right amplifier will amplify said right control signal and a portion of said left control signal and said left amplifier will amplify said left control signal and a portion of said right control signal; and
   means for coupling outputs of said right and left amplifiers to said right and left drive motors, respectively.

2. The apparatus of claim 1 wherein said means for producing right and left control signals comprises right and left potentiometers and a joystick, said joystick coupled to said right and left potentiometers.

3. The apparatus of claim 2 further comprising right and left buffer amplifiers coupled between said right potentiometer and said right amplifier and said left potentiometer and said left amplifier, respectively.

4. The apparatus of claim 3 further comprising a right resistor coupled in series between said right buffer amplifier and said right amplifier and a left resistor coupled in series between said left buffer amplifier and said left amplifier.

5. The apparatus of claim 1 wherein said means for coupling comprises a resistor.

6. An apparatus for controlling the steering of a wheelchair having a right wheel drive motor and a left wheel drive motor, comprising:
   a joystick;
   right and left potentiometers mechanically coupled to said joystick;
   right and left buffer amplifiers coupled to an electrical output of said right and left potentiometers, respectively;
   right and left series resistors coupled in series with the outputs of said right and left buffer amplifiers, respectively;
   right and left drive amplifiers coupled to an output end of said right and left series resistors, respectively;
   a coupling resistor connected between the inputs of said right and left drive amplifiers, respectively; and
   means for coupling outputs of said right and left drive amplifiers to said right and left drive motors, respectively.

* * * * *